(12) United States Patent
Love et al.

(10) Patent No.: US 9,187,098 B2
(45) Date of Patent: Nov. 17, 2015

(54) SYSTEM AND METHOD FOR CONTROLLING A PTO ACCESSORY

(71) Applicant: Caterpillar Inc., Peoria, IL (US)

(72) Inventors: Kraig Love, Dahinda, IL (US); Mahendra Upadahyaya, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 157 days.

(21) Appl. No.: 13/759,094

(22) Filed: Feb. 5, 2013

(65) Prior Publication Data

US 2014/0222285 A1   Aug. 7, 2014

(51) Int. Cl.
| | |
|---|---|
| *B60W 10/06* | (2006.01) |
| *B60W 10/30* | (2006.01) |
| *B60W 30/188* | (2012.01) |
| *B60P 1/16* | (2006.01) |
| *B60P 1/28* | (2006.01) |

(52) U.S. Cl.
CPC ............ *B60W 30/1888* (2013.01); *B60P 1/162* (2013.01); *B60P 1/283* (2013.01); *B60W 10/06* (2013.01); *B60W 10/30* (2013.01)

(58) Field of Classification Search
CPC . B60W 30/1888; B60W 10/30; B60W 10/06; B60W 10/08; B60K 17/28; B60K 25/06; B60P 1/162; B60P 1/283

USPC .......... 701/36, 22, 93, 103; 180/65.265, 53.8, 180/53.4; 406/42; 212/172; 74/11
See application file for complete search history.

(56) References Cited

U.S. PATENT DOCUMENTS

| | | | |
|---|---|---|---|
| 5,611,751 A | 3/1997 | Ehrenhardt et al. | |
| 5,971,888 A | 10/1999 | Goode | |
| 6,045,485 A | 4/2000 | Klinger et al. | |
| 7,101,312 B2 | 9/2006 | Bauerle et al. | |
| 7,377,103 B2 | 5/2008 | Yu et al. | |
| 7,399,255 B1 * | 7/2008 | Johnson et al. | 477/42 |
| 8,012,062 B2 | 9/2011 | Wegeng et al. | |
| 8,046,140 B2 | 10/2011 | Romine et al. | |
| 8,092,342 B2 | 1/2012 | Eriksson et al. | |
| 2006/0137484 A1 | 6/2006 | Seipold et al. | |
| 2009/0111652 A1 * | 4/2009 | Reedy et al. | 477/107 |
| 2009/0143878 A1 * | 6/2009 | Staub et al. | 700/83 |

FOREIGN PATENT DOCUMENTS

WO   2011056265   5/2011

* cited by examiner

*Primary Examiner* — John Q Nguyen
*Assistant Examiner* — Nadeem Odeh
(74) *Attorney, Agent, or Firm* — Glenn Waterfield; Finnegan, Henderson, Farabow, Garrett & Dunner, LLP

(57) ABSTRACT

A system and method for controlling movement of a vehicle body is disclosed. The system and method determines conditions operator input, vehicle speed, and a selected gear. PTO engagement, hydraulic valve displacement, and engine speed commands are determined in response to the conditions.

20 Claims, 3 Drawing Sheets

SYSTEM AND METHOD FOR CONTROLLING A PTO ACCESSORY

TECHNICAL FIELD

The present disclosure relates to a method of controller a power take off accessory on a vehicle.

BACKGROUND

Vehicles equipped with power take off (PTO) systems are known which provide a means for mechanical output in addition to the usual drivetrain functions. Such PTO systems commonly provide power for sprayer pumps, chain drives, hydraulic pumps, and generators. Power for the PTO comes from a combustion engine that drives a transmission. The PTO shaft is typically driven directly from the transmission or via a drop box. The operator of the vehicle typically activates the PTO by a switch that engages a clutch. The operator then controls the engine speed by pressing increment/decrement buttons or by working the accelerator pedal. Engine speed must be controlled to provide the changing power needs of the PTO. The operator then must manipulate an input to control whichever accessory that is being powered by the PTO. In the case of a hydraulic system, this may involve moving a lever that controls a hydraulic valve. In this example, the operator must engage the PTO via a switch, change engine speed via switches or the accelerator pedal, and move a lever to control the hydraulic valve at the same time. In many cases, the accessory driven by the PTO is on the rear of the vehicle or in a location that is difficult to see from the operator station. In this case, it is inconvenient for the operator to look behind the operator station and simultaneously work all three controls at the same time.

In addition, it is difficult for the operator to operate the engine and PTO accessory at optimal levels. For instance, the load on the PTO can increase before the operator can increment the engine speed, potentially stalling the engine. Further, it is possible for the operator to increment the engine speed to a speed at which the PTO accessory can be damaged.

U.S. Pat. No. 7,101,312 to Bauerle et al discloses a PTO system with separate controls for engaging the PTO and incrementing/decrementing the engine speed. Bauerle et al does not disclose combining control of multiple PTO functions into a single operator input. Nor does Bauerle et al disclose a transmission controller configured to send an engine control message that contains a maximum allowed PTO accessory speed.

SUMMARY OF THE INVENTION

A method for controlling movement of a vehicle body is disclosed. The method comprises determining an operator input, determining a vehicle speed, determining a selected gear, and engaging a power take off based on the operator input if the vehicle speed is below a predetermined vehicle speed limit. The method further generates a valve command in proportion to the operator input if the vehicle speed is below a predetermined vehicle speed limit. Next, the method generates an engine speed command in proportion to the operator input if the selected gear is neutral if the vehicle speed is below a predetermined vehicle speed limit.

Further, a transmission is disclosed. The transmission comprises a housing and a transmission controller in electrical communication with a data link. The transmission controller is configured to determine an operator input, determine a vehicle speed, determine a selected gear, and engage a power take off based on the operator input if the vehicle speed is below a predetermined vehicle speed limit. The transmission controller is further configured to generate a valve command in proportion to the operator input if the vehicle speed is below a predetermined vehicle speed limit, and generate an engine speed command in proportion to the operator input if the selected gear is neutral if the vehicle speed is below a predetermined vehicle speed limit.

DETAILED DESCRIPTION

Figure 1:
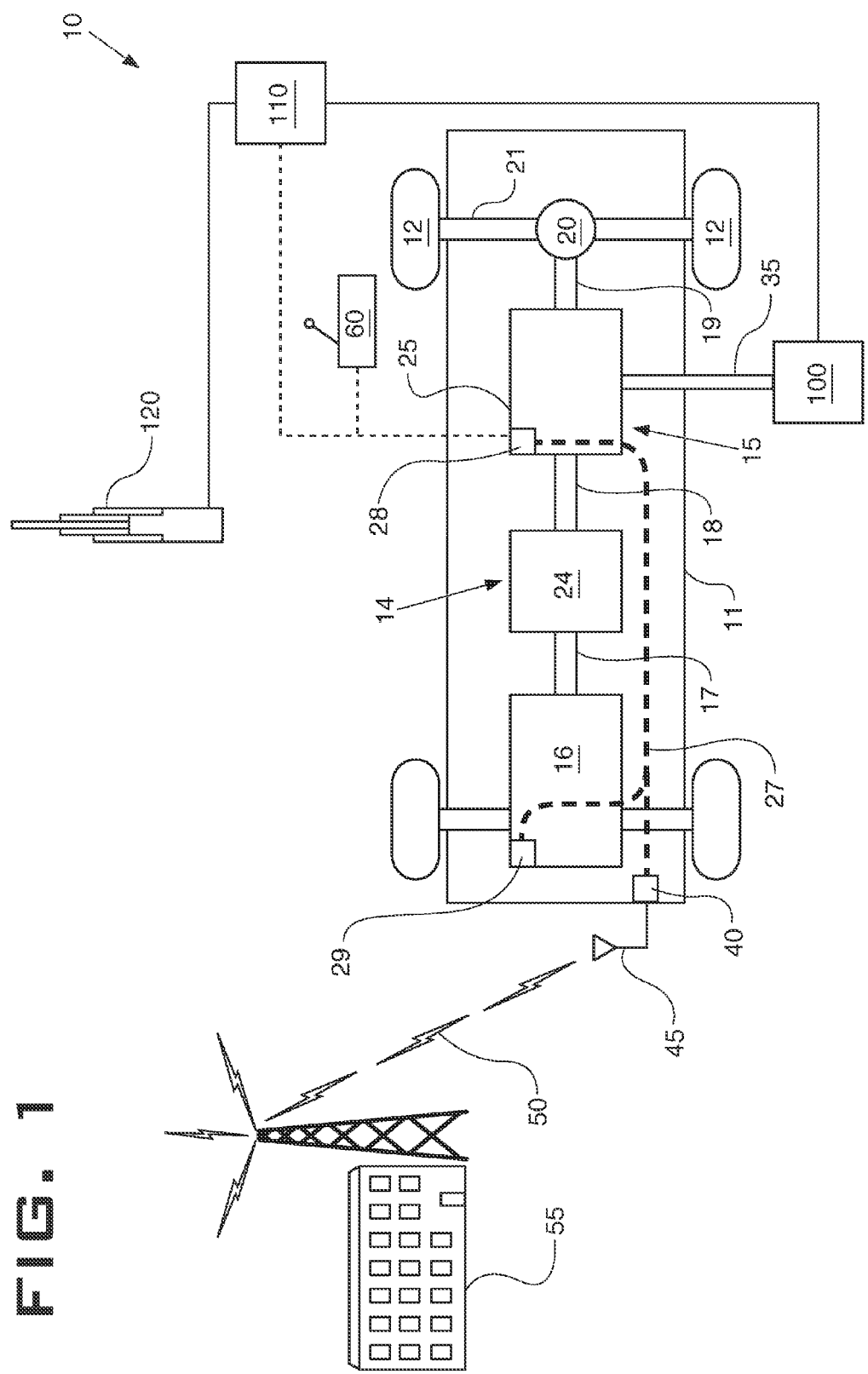
FIG. 1 is a functional diagram consistent with the current disclosure

FIG. 1 shows a vehicle 10 includes a chassis 11 with an attached electronically controlled drive train 14. The chassis 11 is supported on a plurality of wheels 12. The electronically controlled drive train 14 includes an electronically controlled engine 16 coupled to the wheels 12 via an electronically controlled transmission 15. The power from engine 16 is transmitted to wheels 12 via an engine output shaft 17, a transmission input shaft 18, a transmission output shaft 19, a differential 20 and an axle 21. Optionally, the power from engine 16 may be transmitted through the electronically controlled transmission 15 to a power take off (PTO) 35. Electronically controlled drive train 14 may also include a torque converter 24. The electronically controlled transmission 15 includes a housing 25 with an attached electronic transmission controller 28. The engine 16 includes an engine controller 29 that communicates with transmission controller 28 via communication link 27. Communication link 27 may be a proprietary communication link or may be a portion of a standardized communication link, such as J1939 data bus communication network standardized according to the Society of Automotive Engineers (SAE). The transmission controller 28 and the engine controller 29 exchange messages according to a proprietary protocol or according to standard messages formulated according to the J1939 network communication standards known in the art, or via both.

Figure 2:
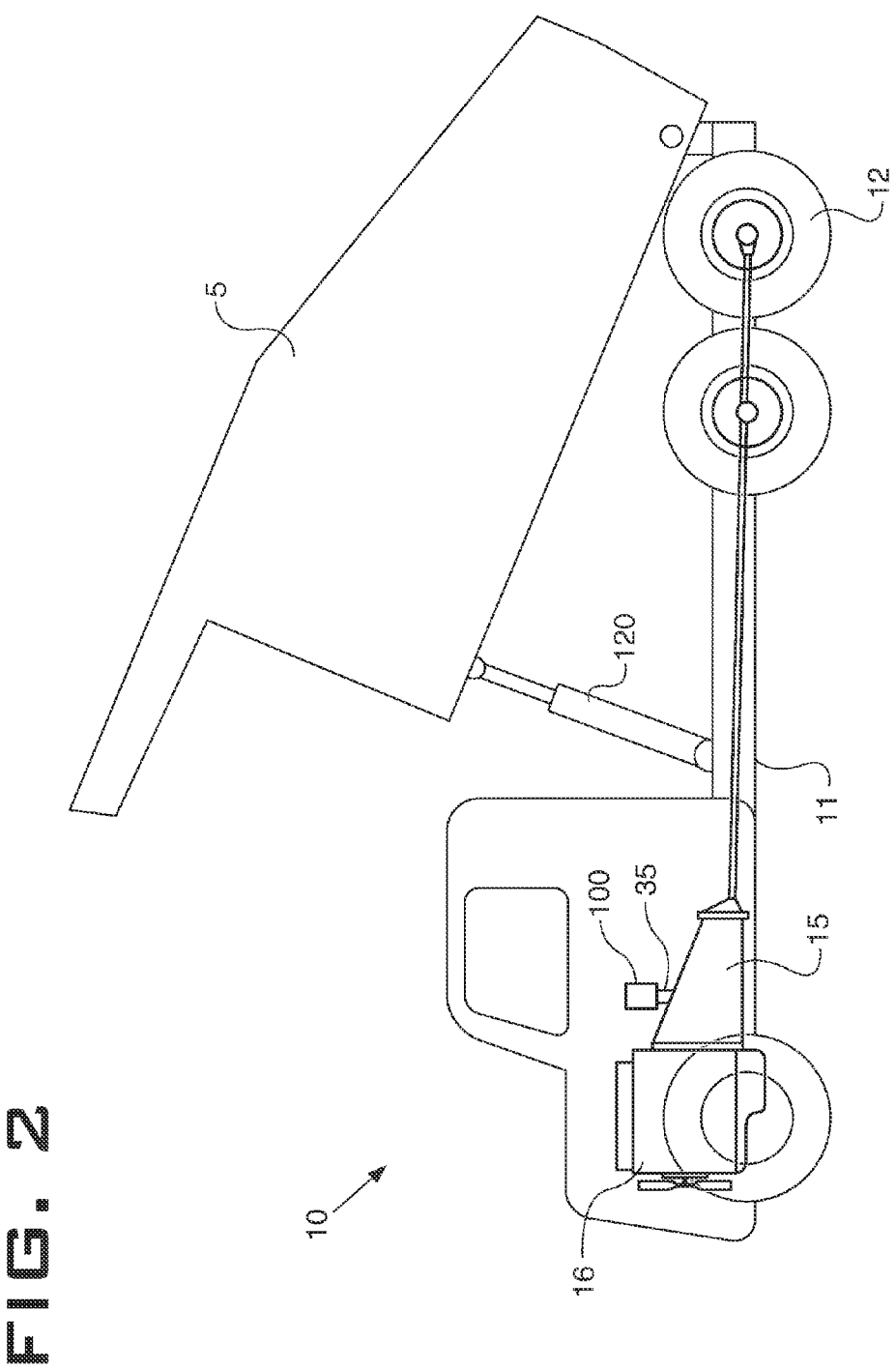
FIG. 2 is a depiction of a vehicle suitable for use with the current disclosure

FIG. 2 shows an example configuration of vehicle 10 consistent with the current disclosure. The vehicle 10 includes an accessory that is powered by PTO 35, in this case a hydraulically-powered lift cylinder 120. The lift cylinder 120 provides a force to tilt the vehicle body 5. An example of a vehicle body 5 is shown in FIG. 2 as a dump body. Other possible examples of a vehicle body include a hoist, boom, or ladder. FIG. 2 also shows chassis 11 and the location of the electronically controlled engine 16 coupled to the wheels 12 via an electronically controlled transmission 15.

The power take off, or PTO 35, is an output shaft from the transmission 15 that is intended to power accessories on the vehicle 10. An example of such an accessory is a pump 100. The PTO 35 is typically driven by a gear set from the transmission input shaft 18 by a gear set inside the transmission housing 25. The ratio of transmission input shaft 18 speed to PTO 35 output speed is typically 1:1. The engine output shaft 17 is connected to transmission input shaft 18. In this instance, the speed of the engine output shaft 17 and the speed of PTO 35 are linked by a 1:1 ratio. It should be understood that the PTO 35 could be driven from any point within the transmission 15 and therefore may have any of a number of gear ratios depending on the design of the transmission. For example, the PTO 35 could alternatively be driven from the transmission output shaft 19. In this case, the speed of the PTO 35 would be the speed of the engine output shaft 17 multiplied by the transmission gear ratio.

The PTO 35 is typically engaged by a clutch. The clutch is activated by the transmission controller 28 in response to an input. The input may be a switch or a lever in the cab of the vehicle 10. The input may be analog or digital in nature. In addition, the input may be over a communication link 27.

The operator input 60 according to the current disclosure may be a lever or joystick. The operator input 60 is electrically connected to the transmission controller 28. The output of the operator input 60 may be by analog, digital, or communication link means. In one example, the output of the operator input 60 comprises a pulse-width modulation signal where the duty cycle of the signal is in proportion to the lever movement.

As shown in FIG. 1, the vehicle 10 includes a hydraulic system for operating an accessory. The hydraulic system is powered by the PTO 35. PTO 35 turns a hydraulic pump 100. The pump 100 is in fluid communication with a valve 110, which may be a proportional hydraulic valve. The valve 110 is in electrical communication with transmission controller 28. The transmission controller 28 may communicate with valve 110 by analog, digital, or communication link 27 means. The valve 110 controls fluid flow to lift cylinder 120, which provides force to move the vehicle body 5.

The transmission controller 28 is configured to communicate with engine controller 29 via a communication link 27. The communication link 27 may be a proprietary communication link or may be a portion of a standardized communication link, such as J1939 data bus communication network. The communication link 27 is configured to send engine control messages from the transmission controller 28 to the engine controller 29. The engine control message may be a TSC1 message that includes an engine speed request. The engine control message may also be a proprietary engine control message that includes an engine speed request. The engine control message may also be a part of a standardized torque/speed control message communicated via a public data bus communication standard. In one exemplary embodiment, the engine control message is contained in a speed limit data field of a Torque/Speed Control #1 (TSC1) message of an SAE J1939 data bus communication standard. In another exemplary embodiment, the engine control message is contained in a torque limit data field of a Torque/Speed Control #1 (TSC1) message of an SAE J1939 data bus communication standard.

The transmission controller 28 may be programmed with a predetermined maximum PTO output speed. It may be useful to limit the PTO output speed to match the limitations of the accessory that is driven by the PTO 35. For instance, the PTO 35 may be connected to a hydraulic pump 100. The pump 100 may experience damage above a certain rotation speed. The speed of the transmission input shaft 18 can be related to the PTO speed by multiplying the gear ratio between the two. Since the speed of the transmission input shaft 18 and the engine output shaft 17 are the same, PTO speed can be related to engine speed. Therefore, the transmission controller 28 can be programmed to send engine control messages that limit the engine output shaft 17 to a speed that does not exceed the desired maximum speed of the PTO 35.

Figure 3:
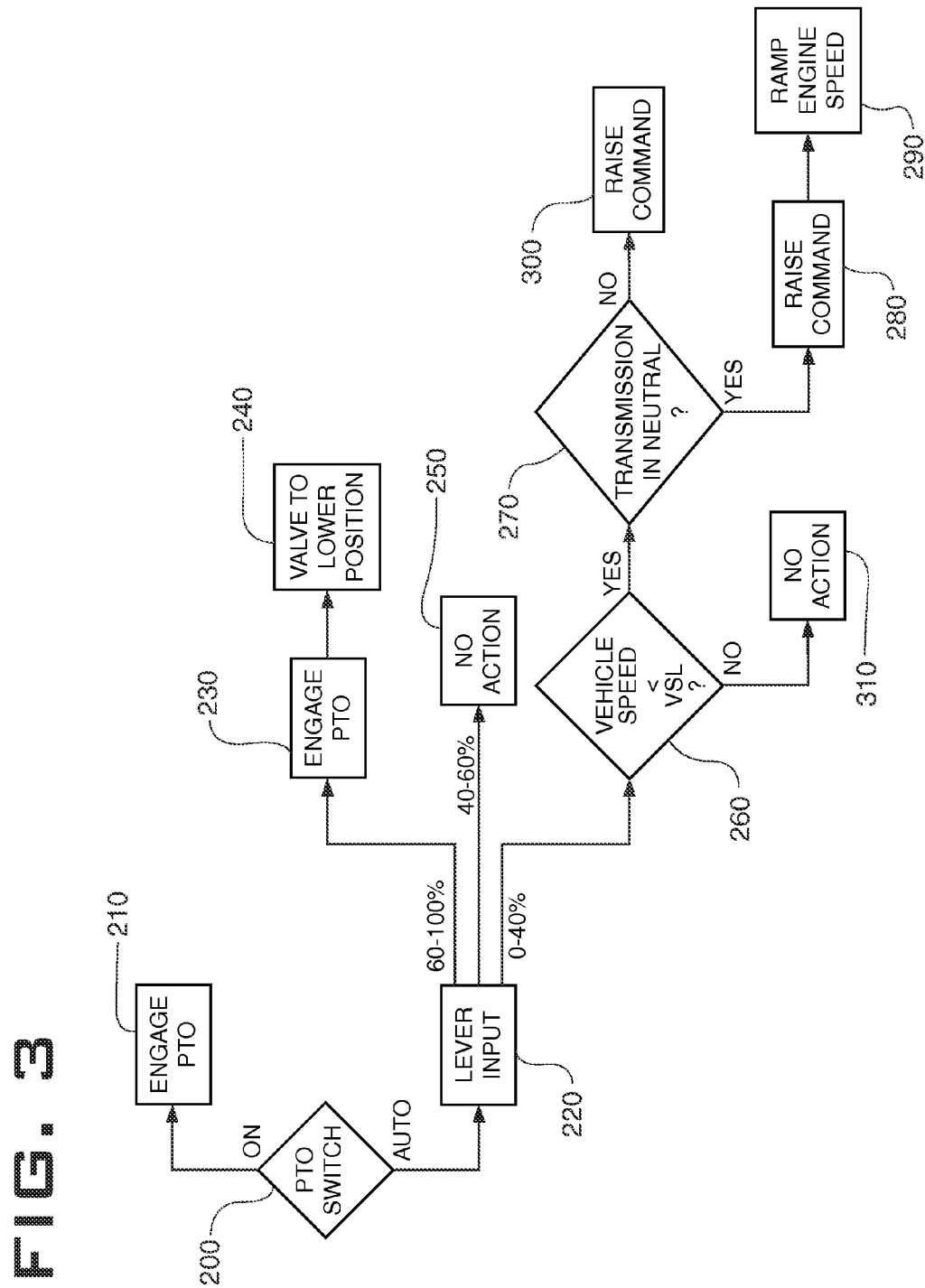
FIG. 3 is a flow chart consistent with the current disclosure

The method and system of the current disclosure allows a single lever to control engagement of the PTO 35, operation of a hydraulic valve 110, and the speed of the engine output shaft 17 in order to tilt a vehicle body 5. FIG. 3 shows a flow chart that provides an example of practicing the method and system of the current disclosure. The method starts at decision box 200 where the method determines whether a PTO switch is set to ON or AUTO. The PTO switch may be located in the cab or elsewhere on the vehicle 10. If the switch is set to ON, the method proceeds to action box 210 where the PTO clutch is engaged. If the PTO switch is set to AUTO, the method proceeds to action box 220. There, the method receives input from an operator input 60, such as a lever. In the example of FIG. 3, the lever input is divided into three ranges—raise, lower, and dead band. It should be understood that the method works equally well with fewer or more ranges. In the example of FIG. 3, the first input range is defined as 60-100% of the lever travel and corresponds to a command to lower the vehicle body 5. If the lever is moved to the first input range, the method proceeds to action box 230 where the PTO clutch is engaged. The method then proceeds to action box 240 where the valve 110 is moved to a lower position, which allows hydraulic fluid to flow from the lift cylinder 120 back to tank and the vehicle body 5 lowers. In the example in FIG. 3, the movement of the valve 110 is proportional to the movement of the lever in the first input range. If the lever input is moved within the second input range, the method proceeds from action box 220 to action box 250 and no action is taken. This is the dead band range. The second range is defined as 40-60% of the lever travel, but could of course vary depending on the application. If the lever input is moved with the third range, the method proceeds from action box 220 to decision box 260. In the example of FIG. 3, the third input range is defined as 0-40% of the lever travel and corresponds to a command to raise the vehicle body 5. If the lever is moved to the third input range, the method proceeds to decision box 260. The method then compares a sensed vehicle speed with a predetermined vehicle speed limit (VSL) 70. The sensed vehicle speed may be provided by a sensor in the transmission 15 or on an element connected to a wheel 12 as is known in the art. The VSL 70 may be programmed into the transmission controller 28 when it is manufactured. Alternatively, the VSL 70 may be entered via a keypad connected to the transmission controller 28. They keypad may be connected via an analog, digital, or data link means. The keypad may be located in the cab of the vehicle 10 or elsewhere on the vehicle. Alternatively, the VSL 70 may be entered into the transmission controller via a service tool that connects to the communication link 27. If the sensed vehicle speed is greater than the VSL 70, then the method proceeds to action box 310 and no action is taken. The PTO 35 will not engage and no raise command is given to valve 110. If the sensed vehicle speed is less than the VSL 70, then the method proceeds to decision box 270. The method then determines whether the transmission 15 is engaged in neutral. The determination can be made by sensing a state within the transmission 15 or detecting a stored value within the transmission controller 28. They method may also determine whether the transmission 15 is engaged in park, depending on the application. If the method determines that the transmission 15 is not in neutral, the method proceeds to action box 300 where the valve 110 is moved to a raise position, which allows hydraulic fluid to flow from the pump to the lift cylinder 120 and the vehicle body 5 raises. In the example in FIG. 3, the movement of the valve 110 is proportional to the movement of the lever in the third input range. If the method determines in decision box 270 that the transmission is in neutral, the method proceeds to action box 280 and the valve 110 is moved to a raise position. As before, the movement of the valve 110 is proportional to the movement of the lever in the third input range. The method then proceeds to action box 290 where engine control messages are sent from the transmission controller 28 to the engine controller 29. The engine control messages may contain a request for a certain engine output shaft speed. The requested engine output shaft speed is is proportional to the movement of the lever in the third input range. For instance, when the lever input is at 40% the engine output shaft speed may be 600 rpm. As the lever input moves from 40% to 0% of range, the transmission controller 28 may send requests for increasing the engine output shaft speed via an engine control message. When the lever input reaches 0% of range, the engine control message may request a maximum engine output shaft speed. As an example, the maximum engine output shaft speed may be 1800 rpm. In this manner, the method and system of the current disclosure allows a single lever to control engagement of the PTO 35, operation of a hydraulic valve 110, and the speed of the engine output shaft 17 in order to tilt a vehicle body 5.

The example shown in FIG. 3 shows control of a one-say lift cylinder 120. That is, the steps that occur when the input lever is moved within the first input range do not include the steps involving checking vehicle speed, transmission status, or ramping engine speed because gravity can assist the lowering of the vehicle body 5. It should be understood, however, that the example in FIG. 3 could be modified to apply to a two-way cylinder 120 by adding the steps shown in boxes 260 through 300.

The vehicle 10 may be connected to an inter-vehicle communication link 50 which connects the vehicle 10 to other vehicles. The inter-vehicle communication link 50 may also connect the vehicle 10 to a base station 55. Messages on the inter-vehicle communication link 50 are received by an antenna 45 and processed by a transceiver 40. The transceiver 40 is connected to communication link 27. In this way, the transmission controller 28 and the engine controller 29 can receive control messages over the inter-vehicle communication link 50. For instance, the vehicle 10 may be operating on concert with a second vehicle 130. The second vehicle 130 may be able to issue requests to the vehicle 10 that result in engaging the PTO 35, actuation of valve 110, or an increase in the speed of engine output shaft 17.

INDUSTRIAL APPLICABILITY

FIG. 2 shows an example of an application of the system and method of the current disclosure. The example of FIG. 2 shows a dump truck as is commonly known. The dump truck includes a vehicle body 5 in the form of a dump body. The vehicle body 5 is configured to tilt at the rear of the vehicle 10 to dump material. Power for tilting the vehicle body 5 is provided by the engine 16 which drives the PTO 35 through the transmission 15. The PTO 35 turns a pump that provides force to tilt the vehicle body 5 by controlling flow to a lift cylinder 120 via valve 110. Although FIG. 2 shows a dump truck, the system and method of the current disclosure is equally applicable to a refuse truck with a dumpster hoist, a refuse truck with a roll-off dumpster, a fire truck with a ladder, and the like.

The operator initiates a vehicle body 5 tilt operation by moving operator input 60 which may take the form of a lever. If the transmission 15 is in neutral and the detected vehicle speed is less than the VSL 70, the transmission controller engages PTO 35. Valve 110 is actuated and engine output shaft speed is ramped in proportion to lever movement. As a consequence, the operator is free to look over his shoulder to the rear of the vehicle 10 in order monitor movement of the vehicle body 5 while operating a single lever to control all three functions.

Combination of all three PTO accessory functions into a single lever also allows for optimal control. For example, the maximum operating speed of pump 100 can be programmed into transmission controller 28. The relationship between the speed of engine output shaft 17, the PTO 35, and the pump 100 is known. Therefore, when the operator input 60 is moved to a maximum range, the transmission controller can send an engine control message with an engine output shaft speed that corresponds to the maximum operating speed of the pump 100. In this manner, the lift cylinder 120 can repeatedly tilt the vehicle body 5 at the maximum speed without further inputs from the operator.

The vehicle 10 is equipped with a transceiver 40 that is connected to the communication link 27. This allows the transmission controller 28 and engine controller 29 to send and receive control messages over the inter-vehicle communication link 50. For instance, the vehicle 10 can receive commands to tilt the vehicle body 5 from the base station 55. If more than one vehicle 10 is present on the work site, the base station 55 may issue commands to tilt the vehicle body 5 of each vehicle 10 simultaneously. Alternatively, commands may be issued to tilt each vehicle body 5 in succession.

The inter-vehicle communication link 50 also allows machines or vehicles to issue commands to each other. Consider a situation when a dump truck is providing material to an asphalt paver. The two machines move together as the dump truck provides material for the paver as it produces the asphalt mat. The asphalt paver may be equipped with a sensor in its hopper that indicates how much material is contained in the hopper. The vehicle 10 and system and method of the current disclosure would allow the asphalt paver to send a command to tilt the vehicle body 5 via control message over the inter-vehicle communication link 50 to communication link 27. Thus, the dump truck could provide additional material to the asphalt paver as needed. Further, the asphalt paver could issue a command to the dump truck issuing a new VSL 70.

What is claimed is:

1. A method for controlling movement of a body on a vehicle, the body being driven by a power take off, the method using a controller configured to perform the steps of:
    determining a travel of an operator input;
    determining a vehicle speed;
    determining a selected gear;
    engaging a power take off clutch in response to the travel of the operator input when the travel of the operator input lies within a predetermined range of travel and the vehicle speed is below a predetermined vehicle speed limit;
    generating a valve command to cause movement of a valve in proportion to the travel of the operator input if the vehicle speed is below the predetermined vehicle speed limit, the valve causing movement of the body;
    generating an engine speed command for an engine configured to drive the power take off in proportion to the travel of the operator input if the selected gear is neutral and if the vehicle speed is below the predetermined vehicle speed limit;
    controlling the valve based on the valve command; and
    controlling the engine speed based on the engine speed command.

2. The method of claim 1 wherein the engine speed command is an engine control message sent via a communication link.

3. The method of claim 2 wherein the communication link is a proprietary communication link.

4. The method of claim 2 wherein the communication link is an inter-vehicle communication link.

5. The method of claim 2 wherein the engine control message is part of a standardized torque/speed control message communicated via a public data bus communication standard.

6. The method of claim 5 wherein the engine control message is contained in a speed limit data field of a Torque/Speed Control #1 (TSC1) message of an SAE J1939 data bus communication standard.

7. The method of claim 5 wherein the engine control message is contained in a torque limit data field of a Torque/Speed Control #1 (TSC1) message of an SAE J1939 data bus communication standard.

8. The method of claim 1 wherein the operator input is sent via a communication link.

9. The method of claim 8 wherein the communication link is an inter-vehicle communication link.

10. The method of claim 1 wherein the generated engine speed command corresponds to a maximum power take off speed if the operator input is at maximum.

11. A vehicle having a moveable body, an engine, and a transmission, the transmission comprising:
  a housing;
  a transmission controller in electrical communication with the transmission and a data link, the transmission controller configured to:
    determine a travel of an operator input;
    determine a vehicle speed;
    determine a selected gear;
    engage a power take off clutch in response to the travel of the operator input when the travel of the operator input lies within a predetermined range of travel and the vehicle speed is below a predetermined vehicle speed limit;
    generate a valve command to cause movement of a valve in proportion to the travel of the operator input if the vehicle speed is below the predetermined vehicle speed limit, the valve causing movement of the body; and
    generate an engine speed command for the engine configured to drive the power take off in proportion to the travel of the operator input if the selected gear is neutral and if the vehicle speed is below the predetermined vehicle speed limit.

12. The transmission of claim 11 wherein engine speed command is an engine control message sent via a communication link.

13. The transmission of claim 12 wherein the communication link is a proprietary communication link.

14. The transmission of claim 12 wherein the communication link is an inter-vehicle communication link.

15. The transmission of claim 12 wherein the engine control message is part of a standardized torque/speed control message communicated via a public data bus communication standard.

16. The method of claim 15 wherein the engine control message is contained in a speed limit data field of a Torque/Speed Control #1 (TSC1) message of an SAE J1939 data bus communication standard.

17. The transmission of claim 15 wherein the engine control message is contained in a torque limit data field of a Torque/Speed Control #1 (TSC1) message of an SAE J1939 data bus communication standard.

18. The method of claim 11 wherein the operator input is sent via a communication link.

19. The method of claim 18 wherein the communication link is an inter-vehicle communication link.

20. The method of claim 11 wherein the generated engine speed command corresponds to a maximum power take off speed if the operator input is at maximum.

* * * * *